United States Patent [19]

Chester et al.

[11] Patent Number: 4,919,787
[45] Date of Patent: Apr. 24, 1990

[54] METAL PASSIVATING AGENTS

[75] Inventors: Arthur W. Chester, Cherry Hill; Pochen Chu, West Deptford, both of N.J.; Albin Huss, Jr., Chadds Ford, Pa.; Garry W. Kirker, Sewell, N.J.

[73] Assignee: Mobil Oil Corporation, New York, N.Y.

[21] Appl. No.: 335,069

[22] Filed: Apr. 7, 1989

Related U.S. Application Data

[63] Continuation-in-part of Ser. No. 138,002, Dec. 28, 1987, abandoned.

[51] Int. Cl.$^5$ .............................................. C10G 11/05
[52] U.S. Cl. ................................ 208/52 CT; 208/114; 208/120; 208/121; 208/122; 208/149; 502/521
[58] Field of Search ............... 208/114, 113, 120, 121, 208/122, 149, 52 CT; 502/521

[56] References Cited

U.S. PATENT DOCUMENTS

| | | | |
|---|---|---|---|
| 4,003,828 | 1/1977 | Eberly, Jr. | 208/216 R |
| 4,179,358 | 12/1979 | Swift et al. | 502/64 |
| 4,228,036 | 10/1980 | Swift et al. | 502/65 |
| 4,430,199 | 2/1984 | Durante et al. | 208/114 |
| 4,515,683 | 5/1985 | Beck et al. | 208/52 CT |
| 4,552,647 | 11/1985 | Hettinger | 208/52 CT |
| 4,567,152 | 1/1986 | Pine | 208/114 |
| 4,650,564 | 3/1987 | Occelli et al. | 208/149 |
| 4,664,779 | 5/1987 | Bertus et al. | 208/52 CT |
| 4,767,733 | 8/1988 | Chester et al. | 502/65 |

*Primary Examiner*—Anthony McFarlane
*Attorney, Agent, or Firm*—A. J. McKillop; C. J. Speciale; R. D. Stone

[57] ABSTRACT

An improved method for passivating metals in a hydrocarbon feedstock during catalytic cracking has been discovered. The method involves contacting the feedstock with a passivating agent comprising a precipitated porous rare earth oxide, alumina, and aluminum phosphate precipitate. The passivating agent may be coated on a cracking catalyst, be part of the matrix of a cracking catalyst, or be added to the cracking operation as discrete particles.

37 Claims, 4 Drawing Sheets

CATALYST TYPES FOR SCAVENGING METALS

FCC CATALYST

SCAVENGER

SCAVENGER COATED FCC CATALYST

FCC CATALYST CONTAINING SCAVENGER(S)

METAL PASSIVATING AGENTS

This application is a continuation-in-part of parent application Ser. No. 07/138,002 filed Dec. 28, 1987, now abandoned. The text of Ser. No. 07/138,002 is incorporated herein by reference.

The present invention is directed to a method for passivating metals that occur in hydrocarbons. More specifically, the present invention is directed to methods for passivating metals such as vanadium, nickel, iron, copper and sodium in order to reduce the deleterious effects of these metals on hydrocarbon catalytic cracking.

BACKGROUND OF THE INVENTION

It is often desirable to convert raw hydrocarbon mixtures such as crude oil and other petroleum feedstocks to commercially valuable fuels. A number of processes for cracking hydrocarbons are known. These processes include, for example, thermophor catalytic cracking (TCC) and fluid catalytic cracking (FCC) (including the FCC process of Ashland/UOP known as reduced crude conversion (RCC)). These processes are described in the literature; reference for TCC: Gary and Handwerk, "Petroleum Refining - Technology and Economics", Marcel Dekker, Inc., 1975, pg. 90–95. Reference for FCC: Venuto and Habib, "Fluid Catalytic Cracking with Zeolite Catalysts", Marcel Dekker, Inc., 1979. Reference for RCC: Lomas, Hammershaimb, and Yunoki, "RCC Technology for New Installations and FCC Unit Conversion", Japan Petroleum Institute Refining Symposium, 1984.

The cracking of hydrocarbons is accomplished by contacting the hydrocarbon to be cracked with a catalyst at elevated temperatures. The catalysts most commonly used for cracking hydrocarbons comprise a crystalline aluminosilicate zeolite that has been incorporated into a matrix. These zeolites are well known and have been described, for example, in U.S. Pat. Nos. 4,432,890 4,707,461 and 4,465,779.

The matrix into which the zeolite is incorporated may be natural or synthetic, and typically has substantially less catalytic activity relative to the zeolite component. Some suitable matrices include clays, silica, and/or metal oxides such alumina and mixtures thereof.

A major difficulty with cracking catalysts is their tendency to become deactivated following contact with certain heavy metal contaminants present in the hydrocarbon feedstock. The deleterious metals include vanadium, nickel, iron, copper and sodium, with vanadium being considered the most deleterious. These metals may be present in the hydrocarbon as free metals or as components of inorganic and organic compounds such as porphyrins and asphaltenes. In addition to lost activity, the catalyst becomes less selective, resulting in increased amounts of undesirable products such as coke and light gases, i.e., hydrogen, methane and ethane.

The magnitude of catalyst deactivation by metals in the feed is known. For example, catalyst requirements as high as 0.5–1.0 lbs per barrel of feed are typical when processing resids compared with 0.1–0.2 lb of catalyst per barrel for conventional gas oils. This dramatic increase in catalyst usage is largely due to the higher metals content of the heavier resid feeds.

The deleterious effects of metals have been discussed extensively in the literature, for example in U.S. Pat. Nos. 4,376,696; 4,513,093; 4,515,900, and are generally well known to those skilled in the art. Vanadium is known to substantially deactivate cracking catalysts by irreversibly destroying the active zeolite. Nickel, iron and copper promote dehydrogenation reactions which result in increased coke and dry gas yields at the expense of the desired liquid products. Sodium reduces catalyst activity by neutralizing acid sites and promoting zeolite degradation.

Methods for counteracting the deleterious effects of heavy metals have been developed. For example, it is known to treat hydrocarbon feeds containing such metal contaminants with a variety of other metals that are said to passivate the contaminating metals. These metals may be added to the hydrocarbon feed as the free metal, or as salts or compounds of the metal, for example, the metal oxide or an organometallic compound. It is believed that the passivating metals form complexes with the contaminating metals, and that the complexes are less harmful to the cracking catalysts than are the uncomplexed contaminating metals.

For example, Beck et al., U.S. Pat. No. 4,432,890 (Ashland Oil, Inc.) discloses the addition of metals such as titanium, zirconium, manganese, indium and lanthanum to a cracking unit during the cracking process. The metals or their oxides or salts may be added to the cracking unit incorporated into a catalyst matrix. Alternatively, soluble compounds of the metals such as organometallic compounds may be added to the cracking unit along with the catalyst and its matrix.

As a further example, Mitchell et al., U.S. Pat. No. 4,707,461 (Chevron Research Company) discloses the addition of a calcium additive such as calcium carbonate during catalytic cracking. The calcium additive may be part of the catalyst matrix or may be introduced separately from the catalyst matrix.

Similarly, Occelli et al., U.S. Pat. No. 4,465,779, (Gulf Research & Development Company) discloses metal additives for passivating contaminating metals in hydrocarbon feeds. The metal additives are magnesium compounds optionally in combination with a heat-stable metal compound such as an oxide of silicon, aluminum, iron, boron, zirconium, phosphorus and certain clay minerals. The additives described by Occelli et al. are separate and distinct from the catalyst.

While methods such as those described above for passivating metal contaminants in hydrocarbon feedstocks have been helpful, the recent trend toward the refining of heavier feedstocks containing larger amounts of metal contaminants require still better passivating methods.

Accordingly, an objective of the present invention is to provide an improved method for passivating metal contaminants such as vanadium, nickel, iron, copper and sodium, and especially vanadium, in hydrocarbon feedstocks during the cracking process. It is a further objective of the present invention to provide a method for passivating metals during catalytic cracking by contacting the metals with a precipitate of a rare earth oxide such as lanthanum oxide, alumina and aluminum phosphate (hereinafter, REOAAP and LAAP, respectively).

SUMMARY OF THE INVENTION

These and other objectives as will be apparent to those skilled in the art have been met by providing a method for passivating metal contaminants such as vanadium, nickel, iron, copper and sodium in a hydrocarbon feedstock contaminated with said metals, which comprises contacting the feedstock under passivating conditions with an amount of precipitated, porous, passivating agent comprising rare earth oxide-aluminum oxide-aluminum phosphate.

DETAILED DESCRIPTION OF THE INVENTION

Figure 1:
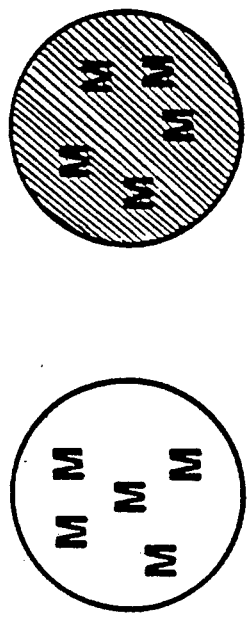
FIG. 1 is an illustration of various embodiments of incorporation of scavengers into catalysts.
Figure 1:
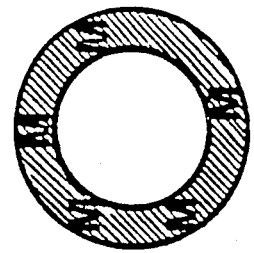
Figure 1:
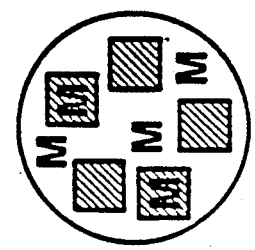

The present invention is directed to an improved method to passivate metals that are deleterious to hydrocarbon catalytic cracking catalysts. The deleterious metals include vanadium, nickel, iron, copper and sodium. Vanadium is the most deleterious, and, therefore, the passivation of vanadium is particularly important.

Hydrocarbon feedstocks undergoing cracking in accordance with this invention comprise hydrocarbons generally and, in particular, petroleum fractions having an initial boiling range of at least 400° F. (205° C.), a 50% point of at least 500° F. (260° C.), and an end point of at least 600° F. (315° C.). Such hydrocarbon fractions include gas oils, residual oils, cycle stocks, whole top crudes and heavy hydrocarbon fractions derived by the hydrogenation of coal, tar, pitches, asphalts and the like. As will be recognized, the distillation of higher boiling petroleum fractions above about 750° F. (400° C.) must be carried out under vacuum in order to avoid thermal cracking. The boiling temperatures utilized herein are expressed, for convenience, in terms of the boiling point corrected to atmospheric pressure.

The cracking catalysts used in conjunction with the passivating agents of the present invention comprise large pore crystalline molecular sieves, which typically are zeolites. Suitable large pore catalysts comprise a large pore crystalline molecular sieve as the active component in a suitable matrix.

Some representative large pore crystalline molecular sieves used in accordance with the invention include zeolite X; zeolite Y; dealuminated Y zeolite, e.g., USY; dealuminated silicon enriched zeolites, e.g., LZ-210; zeolite ZK-5; zeolite L; naturally occurring zeolites, such as faujasite, mordenite and the like; zeolite beta; zeolite omega; mordenite; ZSM-20; pillared silicates and or clays; pillared layered materials and aluminophosphates, e.g., ALPO-5 and VPI-5; silicophosphates, e.g., SAPO-5, -31,-37, -40, and -41; and other metal aluminophosphates also known as MEAPOs. These are variously described in U.S. Pat. Nos. 4,440,871; 4,554,143; 4,567,029; 4,666,875; and 4,742,033. Admixtures of large pore crystalline molecular sieves may also be used.

The large pore crystalline molecular sieves are ordinarily ion exchanged either separately or in the final catalyst with a desired cation to replace alkali metal present as found naturally or as synthetically prepared. The exchange treatment is such as to reduce the alkali metal content of the final catalyst to less than about 1.5 wt % and preferably less than about 0.5 wt %. The purpose of ion exchange is to substantially remove alkali metal cations that are known to be deleterious to cracking, as well as to introduce particularly desired catalytic activity by means of the various cations used in the exchange medium. For the cracking operation described herein, preferred cations are hydrogen, ammonium, the rare earth metals and mixtures thereof, with particular preference being accorded to the rare earth metals. Such rare earth elements include Sm, Nd, Pr, Ce and La. Ion exchange is suitably accomplished by conventional contact of the molecular sieve with a suitable salt solution of the desired cation such as, for example, the sulfate, chloride or nitrate salt.

The large pore crystalline molecular sieves of the cracking catalyst are preferably incorporated in a suitable inorganic oxide matrix because this catalyst form is generally characterized by a high resistance to attrition, high activity and exceptional steam stability. The inorganic oxide which serves as the matrix in which the above zeolite is distributed includes silica gel or a cogel of silica and suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 wt %, preferably 60 to 95 wt %, and the other metal oxide or oxides will generally be within the range of 0 to 45 wt % and preferable 5 to 40 wt %. In addition to the above, the matrix may also comprise natural or synthetic clays, such as kaoline type clays, montmorillonite, bentonite or halloysite. These clays may be used either alone or in combination with silica or any of the above specified cogels in matrix formulation. Such clays can be used in the raw state as originally mined or initially subjected to calcination, acid treatment or chemical modification. In addition to the foregoing materials, they can be composited with a porous matrix material such as a silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-alumina-zirconia. The matrix can be in the form of a cogel.

The content of large pore molecular sieves in the bound catalyst is generally between about 5 and about 60 wt %. Ion exchange of the large pore molecular sieve to replace its initial alkali metal content can be accomplished either prior to or subsequent to incorporation of the porous crystalline silicate into the matrix.

The above compositions may be readily processed so as to provide fluid cracking catalyst by spray drying the composite to form microspheroidal particles of suitable size. Alternatively, the composition may be adjusted to suitable concentration and temperature to form bead type catalyst particles suitable for use in moving bed type cracking systems. Spheres or microspheres containing large pore molecular sieves have been used in catalytic cracking. The particle size of these spheres may be sufficient to pass through a 2 mesh (8 mm) (Tyler) screen and be retained on a 400 mesh (37 u) (Tyler) screen. The spheres may be in the form of a powder, a granule or a molded product (such as an extrudate). As used herein the words spheres and microspheres include beads. The catalyst may also be used in various other forms such as those obtained by tabletting, balling or extruding.

Catalytic cracking units which are amenable to the process of this invention generally operate within the temperature range of about 400° F. (205° C.) to 1600° F. (871° C.), and under reduced, atmospheric or superatmospheric pressure. The catalytic cracking process can be either fixed bed, moving bed or fluidized bed, and the hydrocarbon charge stock flow may be either concurrent or countercurrent to the conventional catalyst flow. The process of this invention is particularly applicable to the fluid catalytic cracking (FCC) process.

The FCC process is well known in the art and detailed description thereof is not believed necessary. Although the design and construction of individual plants vary, the essential elements of an FCC unit are illustrated in U.S. Pat. No. 4,368,114, which is incorporated herein by reference.

Briefly, in the FCC process the catalyst is in the form of microspheres, which acts as a fluid when suspended in oil vapor or gas. The hydrocarbons contact the fluidized catalyst and are catalytically cracked to lighter products. The catalyst is deactivated by coke deposition, necessitating regeneration of coked catalyst in a regenerator.

After cracking, the resulting product gas can be compressed and the resulting products may suitably be separated from the remaining components by conventional means, such as adsorption, distillation, etc.

In accordance with the invention, the passivating agent comprises a precipitate of a rare earth oxide-aluminum oxide-aluminum phosphate (REOAAP), such as lanthana-alumina-aluminum phosphate (LAAP), or a mixture of rare earth oxides-aluminum oxide-aluminum phosphate. The REOAAP is a solid, porous refractory material that has properties different from a mere physical mixture of its components as a result of the components being precipitated together.

The rare earth metals include those with atomic numbers 57 through 71, e.g., La, Ce, Pr, Nd, Sm, Eu, Gd, Tb, Dy, Ho, Er, Tm, Yb, Lu, and mixtures thereof, such as a mixture of lanthanum and cerium.

The REOAAPs are synthesized by neutralizing a solution of rare earth metal or metals and aluminum in phosphoric acid with a basic solution. The presence of an organic base, e.g., tetraalkylammonium or alkylamine, in the synthesis reaction mixture results in a controlled modification of the pore size distribution of the final product composition.

The REOAAP is prepared by forming a first solution containing at least one source of aluminum (+3 valence), a source of rare earth metal (+3 valence) and phosphoric acid; providing a second, basic solution and mixing the first and second solutions together with agitation, e.g., stirring, while maintaining the mixture pH at from about 8 to about 12, preferably from about 8.5 to about 9.5.

Examples of suitable sources of aluminum for the first solution include aluminum nitrate and aluminum sulfate. The first solution will also comprise one or more sources of rare earth metal ($RE^{+3}$), including as suitable examples, lanthanum nitrate, lanthanum chloride and mixed rare earths such as rare earth chlorides. Commercial sources of rare earths often comprise mixtures of salts of such metals, e.g., the chlorides. These aluminum and rare earth metal sources are dissolved in a suitable polar solvent medium, such as water. The first solution will also comprise phosphoric acid ($H_3PO_4$), e.g., in solution with water. The composition of this first solution may be comprised as follows:

| COMPONENT | WT % OF SOLUTION |
|---|---|
| Aluminum | 0.1 to 10 |
| Rare Earth Metal | 0.1 to 10 |
| Phosphorus | 0.2 to 5 |

The second solution will comprise a basic solution (pH of from about 10 to about 14). Suitable components of this second solution include inorganic and/or organic bases such as, for example, ammonium hydroxide, ammonia, tetraalkylammonium hydroxide and alkylamine, alkyl being methyl-, ethyl-, propyl-, butyl- or a mixture thereof, e.g., tetramethylammonium and n-propylamine.

It is believed that the exact composition of the second solution, i.e., the type and concentration of organic or inorganic base, affects the pore size distribution in the final synthesis product. For instance, the use of tetramethylammonium hydroxide in the second solution, as exemplified hereinafter, results in an increased percentage of pores in the 100-200 Angstrom diameter range when compared to use of a basic second solution having no tetramethylammonium.

The source of the rare earth in the REOAAPs may also be a rare earth oxide. The rare earth oxides may be obtained from a commercial source or from one or more minerals such as, for example, monazite, bastnaesite, cerite, loparite, orthite, gadolinite, xenotime, and euxenite. These minerals are widely found in nature and are by no means "rare". Monazite and bastnaesite are the preferred sources since they contain 50-80% rare earths, of which 90% consists of the lighter lanthanides. Through normal mining techniques, these ores can be concentrated to give more than 85% rare earth oxides. Purification to 100% rare earth oxides can be achieved from ores by acid leaching and calcination. A REOAAP may be prepared from a rare earth oxide by dissolving the rare earth oxide ($RE_2O_3$) in acid, and mixing the solution with a basic solution as described above.

The REOAAP is dehydrated, preferably by heating to a temperature in the range of 200° C. to 595° C. in an inert atmosphere, such as air, nitrogen, etc., and at atmospheric, subatmospheric or superatmospheric pressures for between 15 minutes and 48 hours. Dehydration can also be performed at room temperature merely by placing the material in a vacuum, but a longer time is required to obtain a sufficient amount of dehydration.

The REOAAP may be beneficially thermally treated prior to use in a chemical conversion process by heating at a temperature of at least 370° C. for at least 1 minute and generally not longer than 20 hours. While subatmospheric pressure can be employed for the thermal treatment, use of atmospheric pressure is desired for reasons of convenience. The thermal treatment can be performed at a temperature up to about 925° C.

In general, the calcined amorphous refractory composition hereof will have a surface area of from about 50m$^2$/g to about 500m$^2$/g, preferably from about 100m$^2$/g to about 250m$^2$/g; and a pore volume of from about 0.3cc/g to about 1.5cc/g, preferably from about 0.5cc/g to about 1cc/g.

The pore size distribution of the REOAAP in the present invention following calcination will typically include about 5 vol. % to about 20 vol. % within the pore size diameter range of 50 to 100 Angstroms, about 10 vol. % to about 35 vol. % within the pore size diameter range of 100 to 150 Angstroms, about 15 vol. % to about 50 vol. % within the pore size diameter range of 150 to 200 Angstroms and about 10 vol. % to about 50 vol. % within the pore size diameter range of 200 to 400 Angstroms.

A further distinguishing feature of the present refractory composition is its ability to sorb vapor molecules of water, cyclohexane and n-hexane in an Equilibrium Sorption Test, hereinafter detailed, following calcination at 538° C. for 6 hours, of greater than about 10 wt% water, greater than about 6 wt% cyclohexane and greater than about 5 wt% n-hexane.

The relative proportions of components of the present amorphous refractory composition in terms of rare earth oxide:aluminum oxide:aluminum phosphate (weight relationships) will be from about 10:20:70 to about 90:5:5, especially from about 25:20:55 to about 30:25:45.

The REOAAP used in the present invention may comprise one rare earth oxide or a mixture of rare earth oxides. Where the REOAAP comprises one rare earth oxide, the rare earth oxide is preferably lanthanum. Where the REOAAP comprises a mixture of rare earth oxides, the mixture preferably includes a significant amount of lanthanum oxide and at least one other rare earth oxide.

The REOAAP passivates deleterious metals in the feed to prevent the metals from deactivating the cracking catalyst, which is present in the cracking unit along with the passivating agent or is added after a pretreatment of the feedstock with the passivating agent.

In either case, it is important for the amount of the REOAAP relative to the catalyst in the cracking unit to be sufficient to passivate metal contaminants in the feed so as to significantly reduce the deleterious effects of the metal contaminants. The minimum amount of the REOAAP relative to the cracking catalyst may advantageously be as low as about 0.1% by weight preferably about 0.5% by weight and most preferably about 1% by weight. The maximum amount of the REOAAP relative to the cracking catalyst is about 50% by weight, preferably about 25% by weight and most preferably about 10% by weight.

The REOAAP may be present in the feedstock along with the cracking catalyst during the cracking process or, as a pretreatment, prior to addition of the cracking catalyst. When the passivating agent is present in a pretreatment, the passivating conditions are not necessarily the same as the cracking conditions, which are discussed above. The passivating conditions include, for example, temperatures of 100-1000 degrees C., preferably, 400-800 degrees C.

The passivating agent will also passivate metals in the feedstock when the passivating agent and the feedstock are contacted under catalytic cracking conditions. The passivating agent may be present in the form of discrete particles or as part of the catalyst. The passivating agent may be part of the catalyst, for example, as a coating on the catalyst or integrated into the catalyst matrix.

In one embodiment of the invention, the passivating agent is in the form of discrete particles comprising one or more REOAAP. The amount of REOAAP in the discrete particles is not critical, and may be as low as about 25% by weight, but is preferably at least about 50% by weight and more preferably at least about 75% by weight. In general, the greater amount of REOAAP in the discrete particle, the better the improvement in catalyst performance will be. Therefore, the optimal discrete particle will consist essentially of REOAAP. Preferably, the rare earth oxide is lanthanum oxide.

The inert material, if any, that makes up the remainder of the discrete particle in addition to the rare earth oxide and other active compounds may be any material that is catalytically inert with respect to the hydrocarbon feedstock. Inert means inactive or significantly less active than the catalyst that is used in the cracking process.

The inert material that makes up the remainder of the discrete particle may be a matrix added in order to confer a useful property such as increased strength on the particle. The same materials useful as inert matrices in known cracking catalysts and sorbents for cracking processes may also be used as the inert material in the discrete particles of the present invention. Such materials are discussed above.

Particles suitable for use in the present invention can be prepared by processes known in the art. For example, the particles may be ground from larger particles or spray-dried from slurries and then fractionated so as to obtain particles having the desired size The particles may optionally be calcined.

The size of the discrete particles is not critical, and is preferably approximately the same as the size of the cracking catalyst. For example, the minimum size of the discrete particle is approximately about 10 microns, preferably about 20 microns and more preferably about 40 microns. The maximum size of the discrete particles is approximately about 200 microns, preferably about 150 microns and more preferably about 100 microns.

In a further embodiment of the invention, the REOAAP is added as a coating on the cracking catalyst. A cracking catalyst resistant to deleterious metals poisoning, especially to nickel and vanadium poisoning, is obtained when a protective coating that acts as a trap for metals is applied to the surface of the cracking catalyst prior to, or during, exposure to metals-containing feedstocks. This protective coating, which can be strongly bound to the catalyst and acts as a passivator of the metals, can remain protective for the useful life of the catalyst.

Alternatively, the protective coating, which serves the same metals removal and passivation function, can be weakly bound so as to gradually flake off the catalyst. The spent coating material serves as a sacrificial metals trap which continually exposes new sites as the coating attrits off. This is a very effective method of removing nickel from an FCC catalyst and, as a result, of maintaining a low overall metals level in the FCC unit inventory.

To coat a cracking catalyst, a mixture, usually a solution, gel or suspension, of the REOAAP and a solvent, usually water, is prepared. The coating is applied to the cracking catalyst, usually in the form of microspheres, and then dried. In a preferred embodiment, application is by spraying as described in the Examples The coating is dried, preferably at temperatures above 100° C.

The amount of coating on the catalyst particles is that amount that is sufficient to significantly passivate metal contaminants from the feedstock. Following coating and drying, for example, the REOAAP may constitute about 0.1 to 50% by weight, preferably about 0.5 to 25% by weight, more preferably 1.0 to 10.0% by weight of the particles.

In yet another embodiment of the invention, the REOAAP is added to the cracking catalyst particles as part of the matrix. The metal may be added to the matrix by processes known in the art. Accordingly, the REOAAP may be spray dried, impregnated, or precipitated onto or into the matrix of the cracking catalyst. The preferred method for adding the REOAAP to the matrix is by spray-drying, which leaves the REOAAP as a separate, chemically unaltered entity.

An example of the spray drying of kaolin clay, which is one of many possible materials useful as a particle matrix in the present invention, is given starting at column 11, line 10 of U.S. Pat. No. 4,513,093. This example may be adapted for making particles in accordance with the present invention, and is incorporated by reference in the present specification.

EXAMPLE 1

Catalysts

The catalyst of Example 1 was a commercial REY catalyst manufactured by the Davison Division of W.R. Grace. This catalyst was chemically analyzed and found to contain (100% solids basis) 63.7 wt% $SiO_2$, 32.2 wt. % $Al_2O_3$, 3.0 wt% $RE_2O_3$ and 0.57 wt% Na. X-ray analysis indicates an REY content of about 14%. The surface area of the as-received catalyst was 151 $m^2/g$.

EXAMPLE 2

The catalyst of this example was laboratory prepared and contains 20 wt% calcined REY in a $SiO_2$-$Al_2O_3$-clay (60.45/4.55/35 wt/wt/wt) matrix.

Passivating Agents

As detailed in Examples 3-5 below, separate gels of Lanthana-Alumina-Aluminum Phosphate (LAAP), Magnesia-Alumina-Aluminum Phosphate (MAAP) and Tin (IV) Oxide ($SnO_2$) were prepared for surface coating of FCC catalysts. These materials were selected because they contain one or more of the vanadium passivators La, Mg, P and Sn. Both the MAAP and $SnO_2$ coated catalysts showed poor vanadium resistance, and the examples regarding them are included for comparison purposes. The LAAP coating significantly improves the vanadium tolerance of the base catalyst as detailed herein.

EXAMPLE 3

Lanthana-Alumina-Aluminum Phosphate (LAAP) Gel Preparation

Reagent Grade $Al(NO_3)_3.9H_2O$ (26 parts) was dissolved into 68 parts of distilled water. Separately, La($NO_3)_3.6H_2O$ (6 parts) was dissolved in 68 parts of distilled water. These solutions were combined, $H_3PO_4$ (4 parts) was added and the resulting clear solution was well stirred A separate solution consisting of 97 parts of 25 wt% TMAOH (tetramethylammonium hydroxide) was placed in a dropping funnel. These two solutions were next simultaneously added to a beaker which contained 68 parts of distilled water and the contents were continually stirred during the mixing period. The relative addition rates of the two solutions were adjusted to maintain the pH of the suspension at 9.0. The final pH of the suspension containing the white precipitate was 9.11. The suspension was filtered, washed with 1 liter of distilled water and held as a wetcake. The gel (at 6.9 wt% solids) was homogenized in an Oster blender for 3 minutes.

EXAMPLE 4 (Comparative)

Magnesia-Alumina-Aluminum Phosphate (MAAP) Gel Preparation

Reagent grade $Al(NO_3)_3.9H_2O$ (12.5 parts was dissolved in 33.3 parts of distilled water. Separately, $Mg(NO_3)_2.6H_2O$ (0.9 parts) was dissolved in 33.3 parts of distilled water. These solutions were combined and 2.0 parts of (85.8 wt%) $H_3PO_4$ was added with stirring. In a separate vessel, n-propylamine (9.9 parts) was added to 8.0 parts of distilled water and thoroughly mixed. These two solutions were slowly added to a stirred solution of 33.3 parts of distilled water at rates which maintained a constant pH of 9.0. After all of the solution was solids.

EXAMPLE 5

(Comparative)

Tin (IV) Oxide Gel Preparation

Reagent grade $SnCl_4.5H_2O$ (9.2 parts) was dissolved in 52.5 parts of distilled water. Next, slowly and with vigorous stirring, TMAOH (38.3 parts) was added to reach a pH of 5.0. The gel was stirred for 15 minutes, then filtered, washed with 3.3 L of distilled water and pulled to a wet filter cake. The wet cake was then suspended and homogenized in water. The gel was determined to be 3.0 wt% solids at 1000° F.

EXAMPLES 6-9

Coatings

EXAMPLE 6

Using a Yamato Model GA-21 Fluidized Bed Spray Granulator Dryer, the gel of Example 3 was sprayed into a heated (200° C.) fluidized bed of the catalyst of Example 1 so as to apply a surface coating of LAAP on the fluid microspheres. Chemical analysis of a calcined portion of this material indicate the following composition: 55.4 wt% $SiO_2$, 3.75 wt% $RE_2O_3$ (2.5 wt% as $La_2O_3$) and 0.29 wt% P at an ash content of 96.1 wt%. The calculated LAAP content is approximately 2.5 wt% based on P analysis

EXAMPLE 7

(Comparative)

Using the same procedure as described in Example 6 above, the MAAP gel of Example 4 was sprayed onto the catalyst of Example 2 so as to apply a surface coating of MAAP. Chemical analysis of a calcined portion of this material indicate the following composition: 66.3 wt% $SiO_2$, 0.45 wt% P and 0.14 wt% Mg at an ash content of 95.2 wt%. The calculated MAAP content is 3.7 wt% based on P analysis.

EXAMPLE 8

(Comparative)

The catalyst of this example was prepared identically to that of Example 7 except that the fluidized bed spray dryer conditions were altered. Chemical analysis of a calcined portion of this material indicate the following composition: 69.5 wt% $SiO_2$, 0.44 wt% P and 0.12 wt% Mg at an ash content of 94.9 wt%. The calculated MAAP content is 3.6 wt% based on P analysis.

EXAMPLE 9
(Comparative)

Using the same procedure as described in Example 6 above the $SnO_2$ gel of Example 5 was sprayed onto the fluid catalyst of Example 2 so as to apply a surface coating of $SnO_2$. Chemical analysis of a calcined portion of this material indicate the following composition: 71.0 wt% $SiO_2$ and 2.6 wt% Sn at an ash content of 96.4 wt%. The calculated $SnO_2$ content is 3.4 wt% based on the Sn analysis.

CHARACTERIZATION OF EXAMPLES 1-9 CATALYSTS

Several types of analyses were performed which demonstrate that the method employed in Examples 6-9 resulted in a surface coating of the fluid catalyst microspheres with the desired gels. This method did not result in either appreciable surface penetration of the fluid catalysts or formation of individual fluid microspheres of the LAAP, MAAP or $SnO_2$ gels. The evidence which is detailed below is based on scanning electron microscopy (SEM), surface X-ray photoelectron spectroscopy (XPS) and chemical analysis of fines attrited from the coated catalysts.

Scanning Electron Microscopy

Figure 2A:
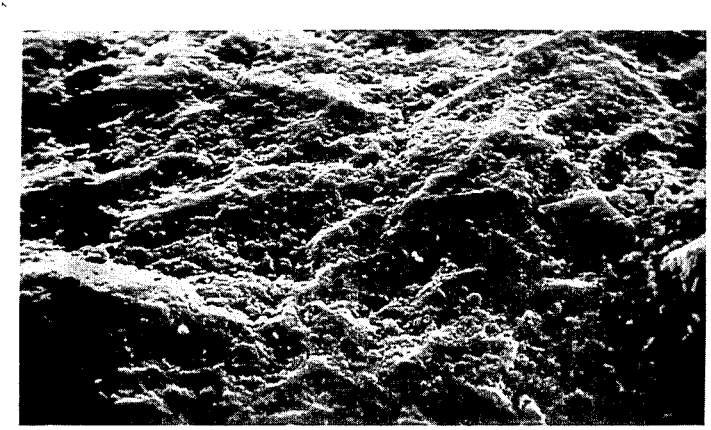
FIG. 2 shows a comparison of the scanning electron micrographs of the uncoated base catalyst of Example 1 and the lanthana-alumina-aluminum phosphate coated catalyst of Example 6.
Figure 2B:
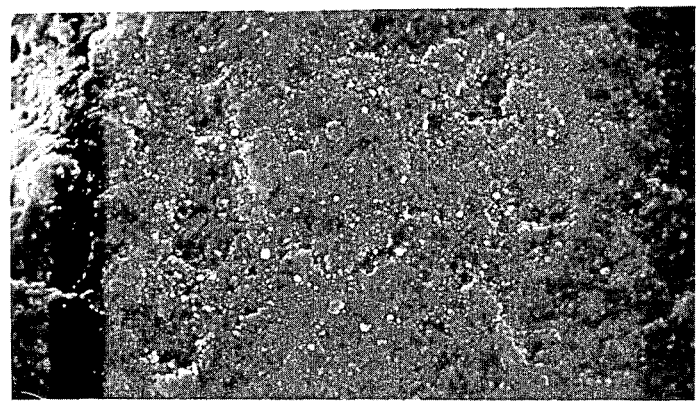

A comparison of the scanning electron micrographs of the uncoated base catalyst of Example 1 and the LAAP coated catalyst of Example 6 is shown in FIG. 2.

Figure 3A:
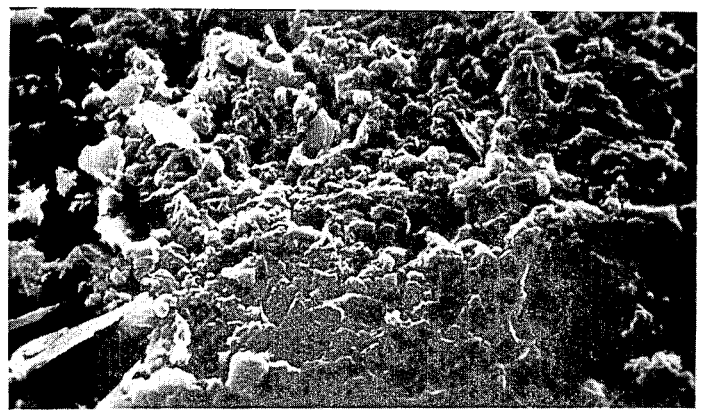
FIGS. 3 and 4 compare the uncoated base catalyst of Example 2 with the magnesia-alumina-aluminum phosphate (MAAP) and $SnO_2$ coated catalysts of Examples 8 and 9, respectively.
Figure 3B:
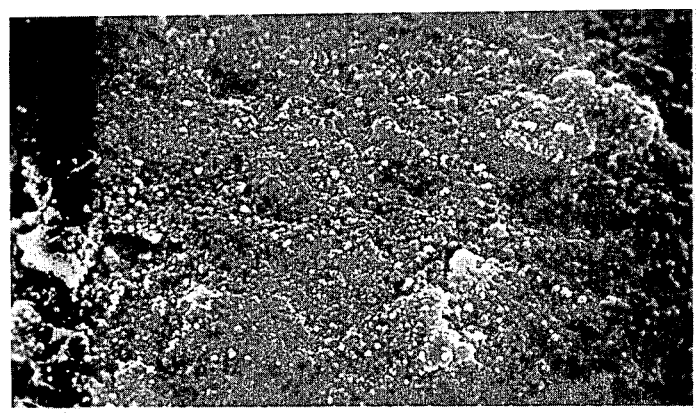
Figure 4:
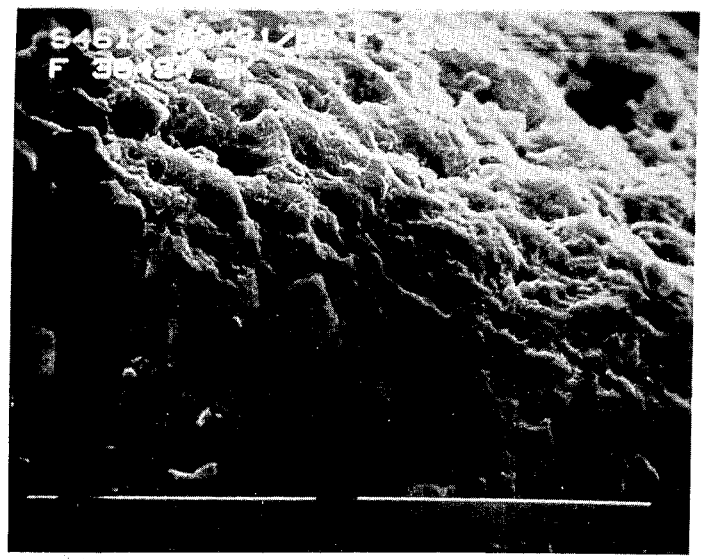

FIGS. 3 and 4 compare the uncoated base catalyst of Example 2 with the MAAP and $SnO_2$ coated catalysts of Examples 8 and 9, respectively. In each case, a substantial change in the surface morphology of the fluid microspheres is observed due to the spray coating procedure.

Surface X-ray Photoelectron Spectroscopy

XPS analysis of the commercial REY base catalyst of Example 1 indicated a surface La content of 2.2 wt% as compared with 1.6 wt% bulk. For the LAAP coated catalyst of Example 6, the surface La content increased to 18.8 wt% while the bulk value increased to only 2.6 wt%. Si is still observed on the LAAP coated particle surface, indicating that while the LAAP is predominately on the surface it does not completely cover all the available surface.

Attrition Analysis of Coated Catalysts

The catalysts of Examples 6-9 were each evaluated in our standard FCC catalyst attrition test using the following procedure: 7.0 cc of calcined (1000° F., 2 hrs) catalyst is contacted in a 1 inch i.d., "U" tube with an air jet formed by passing humidified (60%) air through a 0.07 inch nozzle at 21 liters/min for 1 hour. The fines (0-20 u) generated during attrition are removed as formed in the Roller apparatus and collected in a paper thimble. The particles which are approximately 20 u and larger are retained in the "U" tube. The attrition index (AI) is defined as the increase in the fines fraction (0-20 u) caused by the attrition process.

Due to the nature of the surface coating, one might expect the LAAP, MAAP and $SnO_2$ coatings to be relatively weakly bound to the fluid particles compared with the strength of the base FCC catalyst microspheres. This would result in preferential attriting of the surface coating and a resulting concentration of LAAP, MAAP or $SnO_2$ in the thimble fines product. This is exactly what was observed as shown in Table 1.

TABLE 1
Attrition of Surface Coated FCC Catalysts

| | Example Number | | | |
|---|---|---|---|---|
| | 6 | 7 | 8 | 9 |
| Passivator Coating | LAAP | MAAP | MAAP | $SnO_2$ |
| Wt Percent Coating | 2.5 | 3.7 | 3.6 | 3.4 |
| Thimble Fines (Attrited Product) | | | | |
| Percent of Catalyst Charged | 5.3 | 10.1 | 13.6 | 9.7 |
| Percent Passivator Coating | 42 | 26 | 21 | 22 |
| "U" Tube Product | | | | |
| Wt Percent Passivator Coating Remaining | 1.3 | 1.0 | 2.0 | 1.0 |
| Percent of Initial Coating Retained | 52 | 28 | 54 | 25 |

The foregoing results in Table 1 illustrate the rather weak bonding of the surface coating which flakes off the catalyst during usage. In so doing, the spent surface coating serves as a sacrificial metals trap. As it flakes off it both removes trapped metals from the cracking unit and exposes new passivation and/or catalytic sites.

EXAMPLE 10

A portion of the commercial REY catalyst described in Example 1 was steamed to 1450° F. for 10 hours in a 45% steam/55% air, 0 psig atmosphere. The resulting catalyst had a surface area of 94 m²/g and was analyzed by X-ray to contain 11.3% REY with a corresponding unit cell lattice parameter of 24.56 A°.

EXAMPLE 11

A portion of the LAAP coated commercial REY catalyst described in Example 6 was steamed at the conditions specified in Example 10. The resulting catalyst had a surface of 101 m²/g and was analyzed by X-ray diffraction to contain 12.3% REY with a corresponding unit cell lattice parameter of 24.56 A°.

EXAMPLE 12

A portion of the commercial REY base catalyst of Example 1 was blended with an amount of $V_2O_5$ powder such that the overall vanadium content was 0.5 wt% in the mixture. This mixture was then steamed at the conditions as specified in Example 10. The resulting catalyst contained only 1.9 wt% REY based on X-ray diffraction. Chemical analyses indicates a vanadium content of 0.52 wt%.

EXAMPLE 13

A portion of the LAAP coated commercial REY catalyst of Example 3 was blended with an amount of $V_2O_5$ powder such that the overall vanadium content was 0.50 wt% in the mixture. This mixture was then steamed at the conditions as specified in Example 10. The resulting catalyst contained 2.7% REY based on X-ray diffraction. Chemical analysis indicates a vanadium content of 0.53 wt%.

EVALUATION OF BASE AND LAAP COATED CATALYSTS

To demonstrate the effect of the LAAP coating on the vanadium tolerance of the base FCC catalyst, the catalysts of Examples 10-13 were each catalytically evaluated in a fixed-fluidized bed unit at 960° F. temperature, 3.0 cat/oil (15 WHSV) and 1.0 minutes on-stream using a Heavy Gas Oil feed. The chargestock properties are given in Table 2. The catalytic results, summarized in Table 3, clearly demonstrate a greater vanadium tolerance for the LAAP coated catalyst. Following the addition of 5000 ppm V (as $V_2O_5$) and subsequent hydrothermal treatment, the LAAP-coated catalyst of Example 13 gave a 37.0 vol % conversion of the heavy gas oil feed compared to only 30.8 vol % conversion for the uncoated base catalyst of Example 12.

Attrition Analyses of Vanadium Containing Base and LAAP Coated Catalysts

In order to demonstrate that the LAAP trapped a significant portion of the vanadium, the vanadium containing LAAP coated catalyst of Example 13 and the base catalyst of Example 12 were each evaluated in our standard FCC catalyst attrition test as previously described.

Due to the nature of the surface coating, one might expect the LAAP coating to be relatively weakly bound to the fluid particles compared with the strength of the base FCC catalyst microspheres. This would result in preferential attrition of the surface coating and a resulting concentration of LAAP in the thimble fines product. This is exactly what was observed.

Following the attrition test, both the fines generated during the procedure and the remaining unattrited product were chemically analyzed. The results, summarized in Table 4, clearly show that the vanadium was concentrated in the LAAP coating which attrited off the base catalyst particle. The fines generated from the LAAP coated catalyst contained 2.0 wt % vanadium compared with only 0.6 wt % vanadium for the uncoated base catalyst. Assuming that the non-LAAP portion of the fines generated from the LAAP coated catalyst also contains 0.6 wt % vanadium, the vanadium content of the LAAP fines is approximately 5.6 wt %. These data suggest that if the LAAP coating were increased to around 10 wt %, the majority of the vanadium could be trapped on the catalyst surface.

PASSIVATING AGENT AS PART OF MATRIX

EXAMPLE 14

The catalyst of this example was laboratory prepared and contains 20 wt% calcined REY zeolite in a $SiO_2$/$Al_2O_3$/clay (60.45/4.55/35 wt/wt/wt) matrix.

EXAMPLE 15

The catalyst of this example was laboratory prepared and contains 20 wt% calcined REY in a LAAP/clay (65/35 wt/wt) matrix.

EXAMPLE 16

A portion of the catalyst from Example 14 was steamed at 1450° F. for 10 hours in a 45% steam/55% air mixture at 0 psig in a fluidized-bed steamer.

EXAMPLE 17

A portion of the catalyst from Example 15 was steamed at 1450° F. for 10 hours in a 45% steam/55% air mixture at 0 psig in a fluidized-bed steamer.

EXAMPLE 18

A portion of the catalyst from Example 14 was blended with an amount of $V_2O_5$ powder such that the overall vanadium content was 0.5 wt% in the mixture. This mixture was then steamed at the same conditions as specified in Example 16.

EXAMPLE 19

A portion of the catalyst from Example 15 was blended with an amount of $V_2O_5$ powder such that the overall vanadium content was 0.5 wt% in the mixture. This mixture was then steamed at the same conditions as specified in Example 16.

To demonstrate the effect of the LAAP/clay vs standard $SiO_2$/$Al_2O_3$/clay matrix, the catalysts of Examples 16-19 were each catalytically evaluated in a fixed-fluidized bed unit at 960° F. temperature, 3.0 cat/oil (15 WHSV) and 1.0 minutes onstream using a Heavy Gas Oil feed. The catalytic results, summarized in Table 5, clearly demonstrate a greater vanadium tolerance for the LAAP-containing catalyst. Following $V_2O_5$ addition and subsequent steaming, the conversion of heavy gas oil was 66.9 vol % for the REY/LAAP/clay catalyst compared with 50.4 vol % conversion for the REY/$SiO_2$/$Al_2O_3$/clay catalyst.

EXAMPLE 20

The catalyst of this example was prepared by formulating a LAAP gel as in the procedure of Example 3, filtering the gel to a wetcake, reslurrying the gel and finally spray drying such that the product is a separate particle LAAP FCC additive.

EXAMPLE 21

The catalyst of this example was prepared by making an 85/15 (wt/wt) blend of the commercial REY catalyst of Example 1 and the LAAP additive of Example 20. This blend was then steamed at the same conditions as specified in Example 16.

EXAMPLE 22

The catalyst of this example was prepared by making an 85/15 (wt/wt) blend of the commercial REY catalyst of Example 1 and the LAAP additive of Example 20 and then adding a sufficient amount of $V_2O_5$ powder to give an overall vanadium content of 0.5 wt% in the mixture. This blend was then steamed at the same conditions as specified in Example 16.

EXAMPLE 23

The catalyst of this example was prepared by making a 95/5 (wt/wt) blend of the commercial REY catalyst of Example 1 and the LAAP additive of Example 20 and then adding a sufficient amount of $V_2O_5$ powder to give an overall vanadium content of 0.5 wt% in the mixture. This blend was then steamed at the same conditions as specified in Example 16.

To demonstrate the effect of the separate particle LAAP additive catalyst to the vanadium tolerance of the commercial REY catalyst, the catalysts of Examples 21-23 were each catalytically evaluated in a fixed-fluidized bed unit at 960° F. temperature, 3.0 cat/oil (15 WHSV) and 1.0 minutes on stream using Heavy Gas Oil (HGO) as feed. The catalytic results, summarized in Table 6 along with those of the commercial REY catalyst from Examples 10 and 12, clearly demonstrate a greater vanadium tolerance for the LAAP additive/commercial REY catalyst blend relative to the commercial REY catalyst alone. In the absence of the LAAP additive, steam deactivation of the commercial REY catalyst in the presence of 0.5 wt% vanadium reduced the conversion to only 30.8 vol% of the HGO feed.

Addition of 15 wt% LAAP additive prior to the same steaming procedure (in the presence of 0.5 wt% vanadium) yielded a corresponding conversion of 61.7 vol%. Note that as shown in Table 6 (Examples 10 and 21), in the absence of vanadium, the addition of the LAAP additive to the commercial REY catalyst does not contribute significantly to the conversion of HGO into the gasoline range. Therefore, the higher conversions observed with the LAAP additive/commercial REY catalyst blends in the presence of added vanadium are due to the metals passivating effect of the LAAP. However, a comparison of the results of Examples 10 and 21 does show a lower HFO yield in the case of added LAAP which is indicative of some bottoms cracking activity.

Thus, as the examples set forth have demonstrated, LAAP materials are effective as metals traps/passivating agents for FCC catalysts. They may be used as a matrix component, a separate additive, or as a surface coating.

TABLE 2

| Charge Stock | Heavy Gas Oil (HGO) |
|---|---|
| Gravity, API | 24.3 |
| Aniline Pt., °F. | 171.0 |
| Hydrogen, wt % | 12.3 |
| Sulfur, wt % | 1.87 |
| Nitrogen, wt % | 0.10 |
| Basic Nitrogen, pm | 327.0 |
| Conradson Carbon, wt % | 0.28 |
| Kinematic Viscosity at 210° F. | 3.6 |
| Bromine No. | 4.2 |
| R.I. at 70° F. | 1.5080 |
| Molecular Weigh | 358.0 |
| Pour Point, °F. | 85.0 |
| Paraffins, wt % | 23.5 |
| Naphthenes, wt % | 32.0 |
| Aromatics, wt % | 44.5 |
| Aromatic Carbon, wt % | 18.9 |
| Ni, ppm | 0.3 |
| V, ppm | 0.6 |

TABLE 3

EFFECT OF LAAP COATING ON VANADIUM TOLERANCE OF COMMERCIAL FCC CATALYST

|  | Commercial REY | LAAP Coated Commercial REY | Commercial REY | LAAP Coated Commercial REY |
|---|---|---|---|---|
| Example No. | 10 | 11 | 12 | 13 |
| V Content, ppm | 0 | 0 | 5000 | 5000 |
| Conversion, % vol | 70.3 | 71.6 | 30.8 | 37.0 |
| Product Yields: |  |  |  |  |
| C$_5$+ Gasoline, % vol | 55.6 | 55.6 | 25.1 | 29.5 |
| Total C$_4$'s, % vol | 15.4 | 14.8 | 4.8 | 6.0 |
| Dry Gas, % wt | 7.8 | 8.6 | 3.5 | 4.4 |
| Coke, % wt | 4.5 | 5.5 | 3.0 | 3.1 |
| H$_2$, % wt | 0.07 | 0.08 | 0.25 | 0.30 |
| LFO, % wt | 25.0 | 24.9 | 39.6 | 38.7 |
| HFO, % wt | 7.5 | 6.2 | 30.1 | 25.4 |
| G+D, % wt | 70.5 | 70.5 | 60.4 | 63.3 |
| n-C$_4$, % vol | 1.8 | 1.6 | 0.4 | 0.5 |
| i-C$_4$, % vol | 7.4 | 7.6 | 1.5 | 2.0 |
| C$_4$=, % vol | 6.1 | 5.7 | 3.0 | 3.5 |
| C$_3$, % vol | 2.5 | 2.9 | 0.7 | 0.7 |
| C$_3$=, % vol | 6.9 | 7.3 | 2.4 | 3.2 |

TABLE 4

ATTRITION ANALYSES OF VANADIUM CONTAINING BASE AND LAAP COATED FCC CATALYSTS

|  | Example Number | |
|---|---|---|
|  | 12 | 13 |
| Passivator Coating | — | LAAP |
| Wt Percent Coating | — | 2.8 |
| Thimble Fines (Attrited Product) |  |  |
| Wt Percent of Initial Catalyst | 3.5 | 5.4 |
| Wt Percent Passivator Coating | — | 28.0 |
| Wt Percent Vanadium | 0.6 | 2.0 |
| Gooseneck Product |  |  |
| Wt Percent Passivator Coating | — | 1.4 |
| Wt Percent of Initial Coating Retained | — | 50.0 |
| Wt Percent Vanadium | 0.44 | 0.36 |

TABLE 5

THE EFFECT OF LAAP MATRIX ON THE VANADIUM TOLERANCE OF REY-CONTAINING CRACKING CATALYST

| Matrix | SiO$_2$/Al$_2$O$_3$/Clay | LAAP | SiO$_2$/Al$_2$O$_3$/Clay | LAAP |
|---|---|---|---|---|
| Example Number | 16 | 17 | 18 | 19 |
| V Content, ppm | 0 | 0 | 5000 | 5000 |
| Conversion, % vol | 73.0 | 77.6 | 50.4 | 66.9 |
| Product Yields: |  |  |  |  |
| C$_5$+ Gasoline, % vol | 54.5 | 54.2 | 38.0 | 47.9 |
| Total C$_4$'s, % vol | 17.1 | 17.9 | 9.4 | 11.4 |
| Dry Gas, % wt | 9.3 | 10.8 | 6.6 | 8.3 |
| LFO, % wt | 25.3 | 21.7 | 36.5 | 29.6 |
| HFO, % wt | 4.6 | 3.4 | 14.7 | 6.2 |
| G+D, % wt | 69.9 | 66.2 | 68.0 | 69.3 |

TABLE 6

EFFECT OF LAAP COATING ON VANADIUM TOLERANCE OF COMMERCIAL REY CATALYST

|  | Commercial REY | Commercial REY/LAAP (85/15) | Commercial REY | Commercial REY/LAAP (85/15) | Commercial REY/LAAP (95/5) |
|---|---|---|---|---|---|
| Example Number | 10 | 21 | 12 | 22 | 23 |
| V Content, ppm | 0 | 0 | 5000 | 5000 | 5000 |
| Conversion, % vol | 70.3 | 69.8 | 30.8 | 61.7 | 54.9 |
| Product Yields: |  |  |  |  |  |
| C$_5$ + Gasoline, % vol | 55.6 | 54.0 | 25.1 | 45.8 | 41.3 |
| Total C$_4$'s, % vol | 15.4 | 15.2 | 4.8 | 10.9 | 8.5 |
| Dry Gas, % wt | 7.8 | 8.0 | 3.5 | 6.6 | 5.4 |

TABLE 6-continued

EFFECT OF LAAP COATING ON VANADIUM TOLERANCE OF COMMERCIAL REY CATALYST

|  | Commercial REY | Commercial REY/ LAAP (85/15) | Commercial REY | Commercial REY/ LAAP (85/15) | Commercial REY/ LAAP (95/5) |
| --- | --- | --- | --- | --- | --- |
| LFO, % wt | 25.0 | 28.0 | 39.6 | 32.3 | 36.0 |
| HFO, % wt | 7.5 | 5.2 | 30.1 | 8.1 | 11.2 |
| G + D, % wt | 70.5 | 72.5 | 60.4 | 70.4 | 70.5 |

What is claimed is:

1. Method for passivating metals in a hydrocarbon feedstock contaminated with said metals, which comprises contacting the feedstock under passivating conditions with an effective amount of a precipitated, porous, passivating agent comprising rare earth oxide-aluminum oxide-aluminum phosphate.

2. The method according to claim 1, wherein the metals contained in said hydrocarbon feedstock are selected from vanadium, nickel, iron, copper and sodium.

3. The method according to claim 1, wherein the rare earth oxide is lanthanum oxide.

4. The method according to claim 1, wherein the passivating agent comprises rare earth oxide, aluminum oxide and aluminum phosphate in a weight ratio of from about 10:20:70 to about 90:5:5.

5. The method according to claim 1, wherein the passivating agent is in the form of discrete particles that comprise rare earth oxide-aluminum oxide-aluminum phosphate.

6. The method according to claim 5, wherein the rare earth oxide is lanthanum oxide.

7. The method according to claim 5, wherein the passivating agent comprises rare earth oxide, aluminum oxide and aluminum phosphate in a weight ratio of from about 10:20:70 to about 90:5:5.

8. The method according to claim 5, wherein the discrete particles consist essentially of rare earth oxide-aluminum oxide-aluminum phosphate.

9. The method according to claim 5, wherein the discrete particles ar contacted with the feedstock in the absence of a cracking catalyst.

10. The method according to claim 5, wherein the discrete particles are contacted with the feedstock in the presence of a cracking catalyst.

11. The method according to claim 10, wherein the catalyst comprises a crystalline moleculer sieve.

12. The method according to claim 11, wherein the molecular sieve is a large pore zeolite.

13. The method according to claim 12, wherein the zeolite is zeolite Y or dealuminated zeolite Y.

14. The method according to claim 13, wherein the dealuminated zeolite Y is USY.

15. The method according to claim 10, in which the catalyst is in the form of microspheroidal fluid cracking catalyst particle.

16. The method according to claim 10, in which the catalyst is in the form of spherical beads for moving bed catalytic cracking.

17. The method according to claim 10, wherein the discrete particles are contacted with the feedstock under catalytic cracking conditions.

18. The method according to claim 1, wherein the passivating agent is in the form of a coating on a cracking catalyst.

19. The method according to claim 18, wherein the passivating agent comprises rare earth oxide, aluminum oxide and aluminum phosphate in a weight ratio of from about 10:20:70 to about 90:5:5.

20. The method according to claim 18, wherein the catalyst comprises a crystalline molecular sieve.

21. The method according to claim 20, wherein the crystalline molecular sieve is a large pore zeolite.

22. The method according to claim 21, wherein the large pore zeolite is zeolite Y or dealuminated zeolite Y.

23. The method according to claim 22, wherein the dealuminated zeolite Y is USY.

24. The method according to claim 18, in which the catalyst is in the form of microspheroidal fluid cracking catalyst particle.

25. The method according to claim 18, in which the catalyst is in the form of spherical beads for moving bed catalytic cracking.

26. The method according to claim 18, wherein the passivating conditions are catalytic cracking conditions.

27. The method according to claim 18, wherein the rare earth oxide is lanthanum oxide.

28. The method according to claim 1, wherein the passivating agent is incorporated into a matrix of a cracking catalyst.

29. The method according to claim 28, wherein the passivating agent comprises rare earth oxide, aluminum oxide and aluminum phosphate in a weight ratio of from about 10:20:70 to about 90:5:5.

30. The method according to claim 28, wherein the catalyst comprises a crystalline molecular sieve.

31. The method according to claim 28, wherein the crystalline molecular sieve is a large pore zeolite.

32. The method according to claim 31, wherein the large pore zeolite is zeolite Y or dealuminated zeolite Y.

33. The method according to claim 32, wherein the dealuminated zeolite Y is USY.

34. The method according to claim 28, in which the catalyst is in the form of microspheroidal fluid cracking catalyst particle.

35. The method according to claim 28, in which the catalyst is in the form of spherical beads for moving bed catalytic cracking.

36. The method according to claim 28, wherein the passivating conditions are catalytic cracking conditions.

37. The method according to claim 28, wherein the rare earth oxide is lanthanum oxide.

* * * * *